United States Patent [19]

Callens et al.

[11] 4,017,688
[45] Apr. 12, 1977

[54] METHOD AND DEVICES FOR INSERTING ADDITIONAL PATTERN IN, OR REMOVING SAME FROM, A MESSAGE

[75] Inventors: Paul Raymond Callens, Cagnes sur Mer; Jean Louis Picard, La Colle sur Loup; Alain Jean Poulet, Nice, all of France

[73] Assignee: International Business Machines Corporation, Armonk, N.Y.

[22] Filed: Apr. 10, 1975

[21] Appl. No.: 567,021

[30] Foreign Application Priority Data

Apr. 12, 1974 France ............................ 74.14306

[52] U.S. Cl. .................. 179/15 AF; 178/69.1; 340/347 DD
[51] Int. Cl.² .......................................... H04J 3/06
[58] Field of Search .......... 178/69.5 R; 179/15 AF, 179/15 BD; 340/347 DD

[56] References Cited

UNITED STATES PATENTS

| 3,569,631 | 3/1971 | Johannes | 179/15 AF |
| 3,646,271 | 2/1972 | Shigaki | 179/15 AF |

Primary Examiner—Gareth D. Shaw
Assistant Examiner—C. T. Bartz
Attorney, Agent, or Firm—Karl O. Hesse

[57] ABSTRACT

A method and a device for modifying a stream of information elements, particularly with a view to compensating for variations of the speed at which such elements are transmitted over the successive portions, or links, of a transmission network.

10 Claims, 29 Drawing Figures

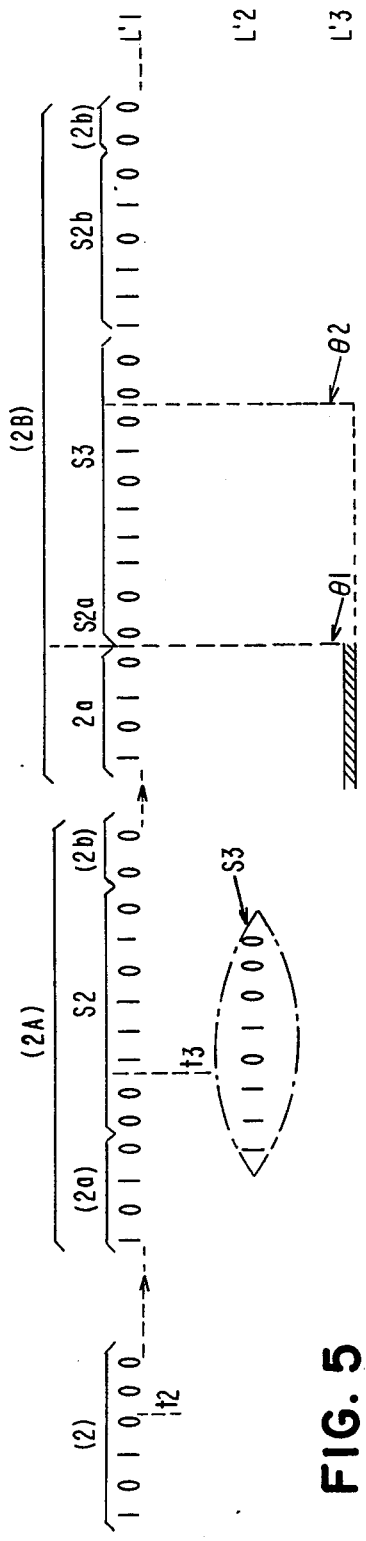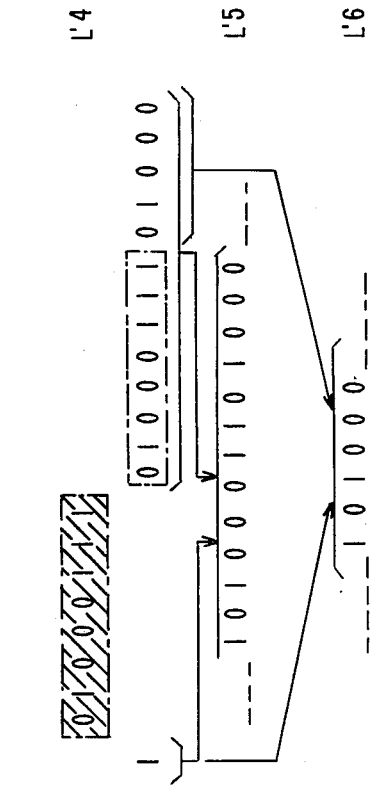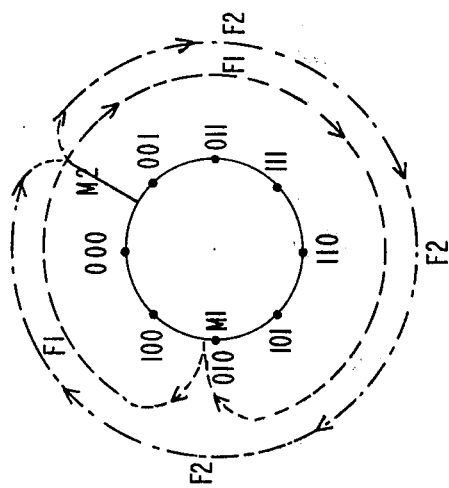
FIG. 5
FIG. 6

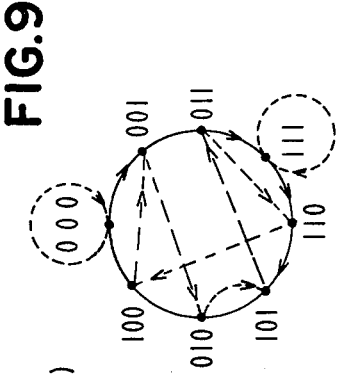
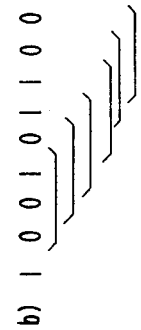
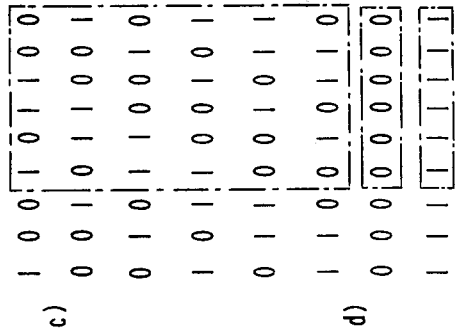
FIG. 9
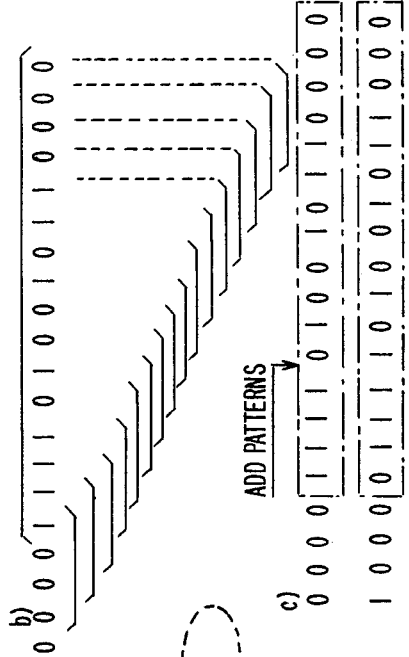
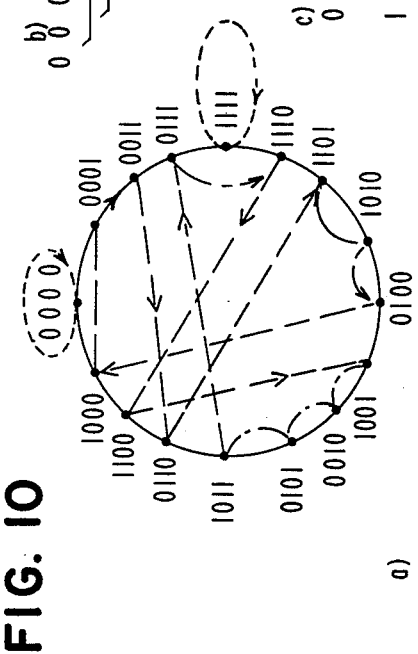
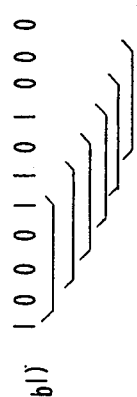
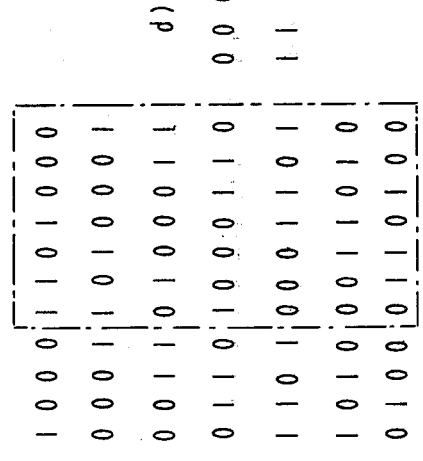
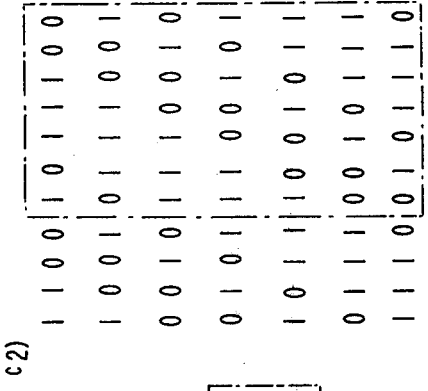
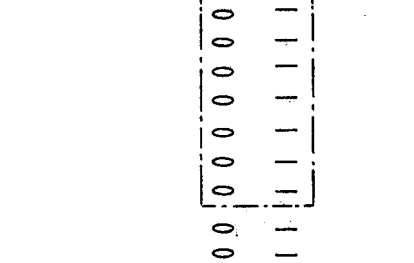
FIG. 10

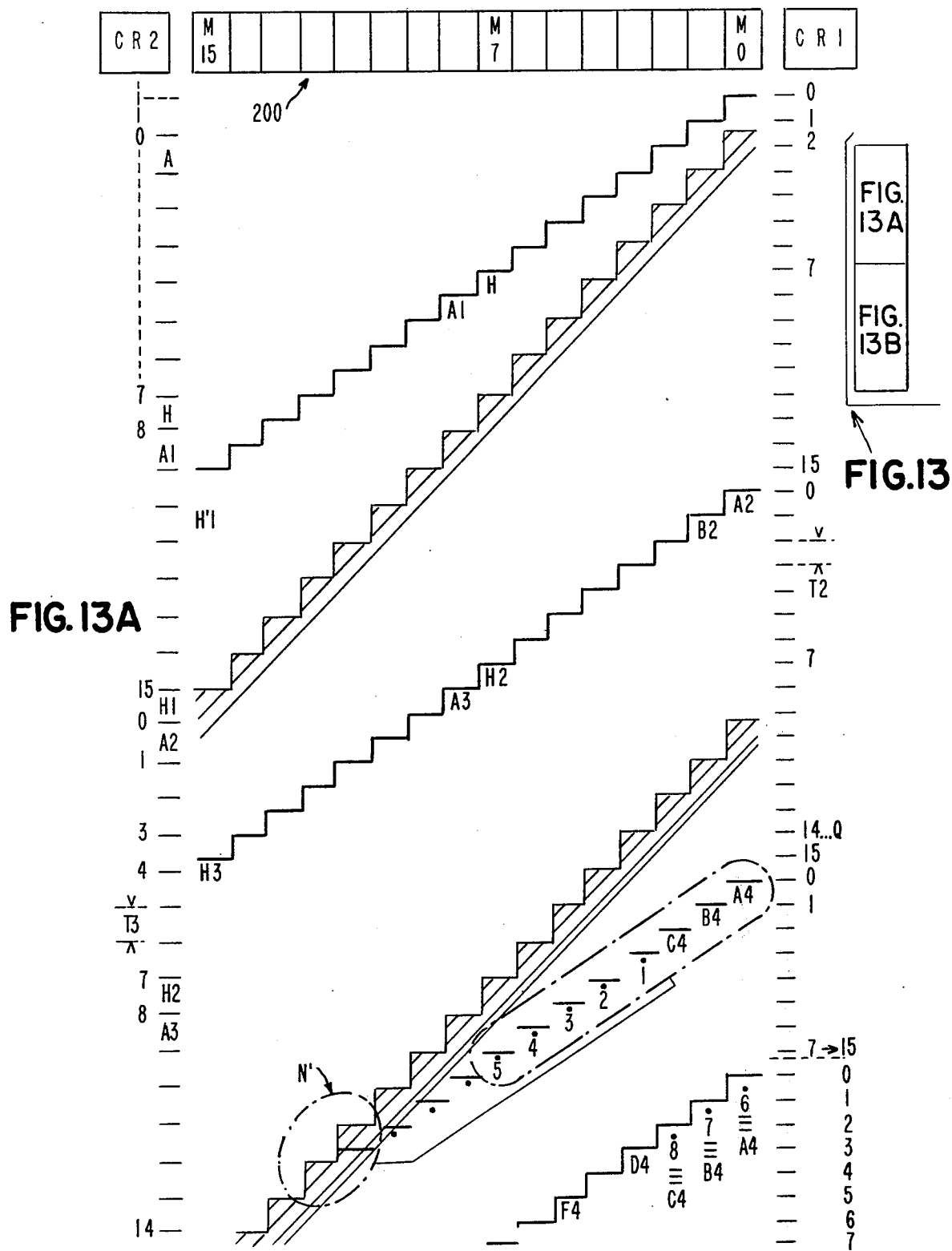

$Y = Z = 0 \rightarrow \beta = 1$
$\underbrace{\qquad\qquad}_{(\theta)}$ $e1 = 1$ VALUE
ON LINE 213: $e3$ VALUE ON LINE 213 : e3

METHOD AND DEVICES FOR INSERTING ADDITIONAL PATTERN IN, OR REMOVING SAME FROM, A MESSAGE

BACKGROUND OF THE INVENTION

At the present time, three main techniques are used for transmitting digital data over a network comprising a number of nodes, namely, message switching, packet switching and line switching.

Message switching consists in storing incoming messages received at each node of the network and in retransmitting them at some later time over the proper outgoing lines. Packet switching is similar to message switching, except that incoming messages are first divided into portions, or "packets", which are then stored and retransmitted.

Line switching (either in space or in time) consists in setting up a physical circuit path between the incoming and outgoing lines. This technique is more widely used than either message switching or packet switching as it makes it possible, in particular, to handle very long messages, such as those generated by optical character readers or by digital voice coders, whereas the processing of such messages would require large size storage devices if the latter tecniques were employed. In practice, the use of message switching or packet switching is generally restricted to the more important nodes of a transmission network.

Line switching per se is well known. Any telephone call between two parties involves this technique. Line switching is also used for the transmission of digital data since many devices permit converting such data into signals that can be transmitted over telephone lines and retrieving the original data at the receiving end.

However, because a network frequently comprises long and/or numerous links, it may prove necessary, in order to maintain the integrity of the original data, to demodulate the signals received at certain nodes and to modulate them again before retransmission, resulting in a break of continuity at these nodes.

Regardless of the accuracy of the timing devices used in a transmission network, it is difficult to achieve the same data-signaling rate on both sides of each node. Various means have been proposed to synchronize all components of a network so as to obtain the same signaling rate on all links, but such means are costly. The present invention permits to achieve the same result without having to synchronize the components of the network. It should be noted that, in practice, the signaling rate from one link to another remains very close to the same value.

One way of facilitating the transmission of data is to use at each end of the network devices whose transmission speed is slightly lower than the lowest speed achieved on the various links. As is known, this makes it possible to add to the information elements, at the transmitting end, a sequence of digital elements the number of which may then be modified, that is, increased or decreased, at the different nodes so as to compensate for variations of the signaling rate.

Several known methods may be used to insert the additional elements in the information elements. For example, one may insert a given number of consecutive identical elements and take steps to ensure that the configuration of any part of the information elements will not be identical with that of the additional elements.

However, none of these methods allow a sequence of additional elements to be inserted in or removed from the information elements at any time.

In order that the transmission of the information elements may be transparent (that is, independent of their meaning) and that the additional elements may be inserted or removed at any time, thereby eliminating the need for using large size buffers, the following requirements must be met:

1. Insertion of the additional elements must be immediate, i.e., must take place as soon as an appropriate instruction is received.

2. Removal of the additional elements must be practically immediate, i.e., must take place within a very short time interval after receipt of an appropriate instruction.

3. The probability that the configuration of any part of the information elements will be identical with that of the additional elements must be low, and in the event of the two configurations being identical, it must be easy to modify the configuration of the information elements.

SUMMARY OF THE INVENTION

Accordingly, it is an object of the present invention to provide a method of determining a sequence of additional elements which may be inserted immediately in a stream of information elements or in a sequence of additional elements previously inserted in a message, with no adverse effects on the information elements (thereby meeting requirement 1. above).

Another object of the invention is to allow the additional elements to be removed from a message as soon as they are detected following receipt of an appropriate instruction, with no adverse effects on the information elements (thereby meeting requirement 2. above).

Still another object of the invention, which derives from the preceding object, is to cause the insertion of additional elements in a sequence of additional elements previously inserted in a message to produce a resultant configuration all or part of which may be removed from the message without adversely affecting the remaining elements thereof.

Yet another object of the invention is to minimize the probability of the configuration of any part of the information elements being identical with that of the additional elements inserted therein and, in the event of the two configurations being identical, to make it possible to modify the configuration of the information elements through the use of a minimum of supplementary elements.

To accomplish these and other objects, the invention is characterized in that the sequences or patterns of additional elements, referred to herein as additional patterns, are predetermined from the possible combinations of n digital elements each of which is capable of assuming p values, the predetermination of said additional patterns including the steps of:

given a family, referred to herein as a family of order $n$, comprised of the $K=P^n$ possible combinations of said $n$ digital elements, and given M manners of classifying the K combinations whereby each combination can be derived from the previous one by adding one digital element to the last $n$-1 elements of the latter; selecting one of these M manners, thereby defining a family of order $n$ of type T;

forming a sequence SU of $n+K$ digital elements wherein the first $n$ of these elements form one of said combinations and wherein the subsequent digital elements are such that each of them forms, together with the $n-1$ elements preceding it, a group of $n$ elements corresponding to that which follows, in the classification of type T, the combination comprised of the $n$ elements preceding that elements, said sequence SU providing the initial combination again after having provided the K-1 other combinations, thereby defining the additional pattern of K digital elements to be inserted after said initial combination; and defining by means of cyclic permutations of the sequence SU the set of K additional patterns of K additional elements which are to respectively follow each of the K possible combinations of $n$ digital elements; and is further characterized in that, whenever one of the predetermined additional patterns is to be inserted in the message, the latter is interrupted and the additional pattern defined by the combination comprised of the $n$ digital elements preceding the interruption is inserted in the message.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIG. 5 shows a message including an additional pattern inserted in another pattern and illustrates the removal of a pattern.

FIG. 6 is a schematic diagram illustrating the process associated with the removal of one of the patterns of FIG. 5.

FIGS. 9 and 10 illustrate different additional patterns.

DESCRIPTION OF A PREFERRED EMBODIMENT

Figure 1:
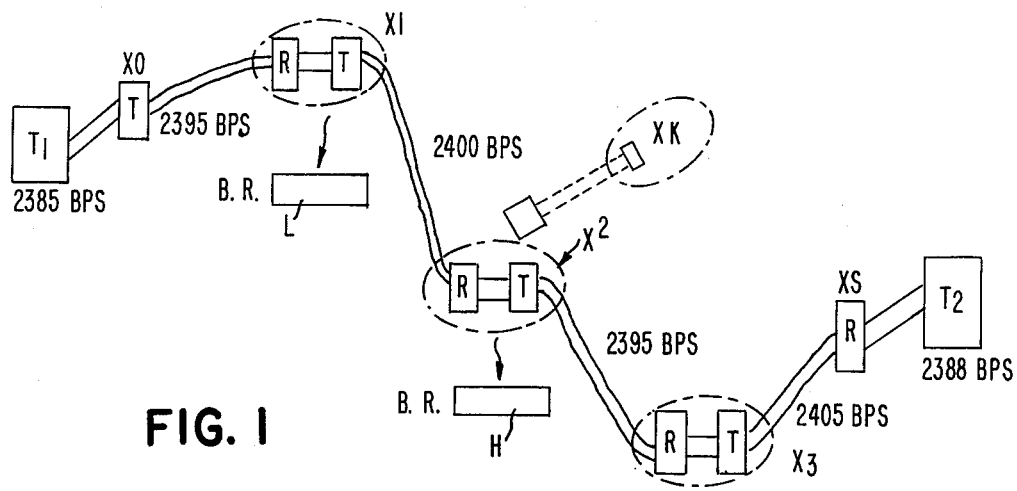
FIG. 1 is a schematic diagram illustrating a transmission network wherein the invention can be implemented.

Referring now to FIG. 1, a transmission network between two digital devices, T1 and T2, is shown in schematic form, said network incorporating the present invention. The data-signaling rates indicated in relation to the various links of the network are given by way of example only; this also applies to the operating speeds of devices T1 and T2. However, the values shown (2395 bps on the links between X0 and X1 and between X2 and X3, 2400 bps on the link between X1 and X2, and 2405 bps on the link between X3 and XS) may be regarded as fairly typical of what would be obtained in actual practice for a common nominal rate of 2400 bps.

Digital devices T1 and T2 may consists, for example of multiplexors, computers or terminals such as printers, keyboards, card readers or displays. In general, the reception circuits of these devices are designed to automatically synchronize with the exact rate at which the data are received.

However, the synchronization of the data-signaling rates throughout the network between T1 and T2 would call for the use of more complicated equipment at the switching nodes X1, X2 and X3. The receiver R of node X1 will automatically operate in synchronism with the transmitter T of X0 while the receiver R of node X2 will automatically operate in synchronism with the transmitter T of node X1, but it would be necessary, at each of the three nodes X1-X3, to synchronize the receiver R and the associated transmitter T. This would entail an excessive complication of the equipment. Also, in a network where line switching is used at the various nodes, the transmitter and the receiver at the respective ends of a given link of the network always work together, but a given link, such as that between nodes X1 and X2, is not always connected to the same link (for example, the link between X1 and X2 might be connected to the link between X2 and XK for the purposes of another communication), thereby increasing the difficulty of synchronizing the receiver associated with a given link and the transmitter associated with another line.

In the present invention, each link of the network operates independently. Each receiver supplies the received message elements, at the speed at which it received them, to the input of the next transmitter, through an interface to be described later. This interface includes a buffer B.R. and ensures the continuity of the transmission in accordance with the invention.

For example, in the case of transmitter T of node X1 which receives data at 2395 bps and transmits same to node X2 at 2400 bps, the interface circuits will cause an additional pattern to be inserted in the message when a minimum amount L of data is stored in the associated buffer B.R. Conversely, the message so modified will be received at node X2 at 2400 bps and transmitted, as shown, to node X3 at 2395 bps; accordingly, the interface circuits associated with transmitter T at node X2 will cause an additional pattern to be removed from the message when a maximum amount H of data is stored in the buffer B.R. associated with node X2.

The more common situations in which the present invention permits to solve the continuity problem have been described above in relation to FIG. 1 and it has been indicated that the proposed solution involves inserting an additional pattern in the message and/or removing such a pattern therefrom.

In what follows, the manner of determining the requirements which such operations must meet in order not to perturb the original message and of defining said additional patterns in accordance with the method of the present invention will first be explained by means of examples; a description of the interface circuits which allow this method to be implemented will then be given.

If the number of inerface circuits, and in particular the number of storage positions of the buffers, is to be reduced, one of the requirements that must be met is that insertion of any additional pattern in a message take place immediately on receipt of an appropriate instruction, regardless of the meaning of the information elements at that particular instant.

Since the message may already include one or more such patterns, it must be possible to insert a new additional pattern in a previously inserted one, and the resultant pattern must be such that it will always and uniquely be recognized as a set or "block" of additional elements. Similarly, it must be possible to remove from the message the first additional pattern which is detected after an appropriate instruction has been received.

In accordance with the invention, the family of order $n$ is comprised of additional patterns of $2^n$ bits. These patterns are defined by using as a basis the $2^n$ possible combinations of values of $n$ bits are by writing a sequence of $n+2^n$ bits whose values are such that the first $n$ bits will provide a first combination of $n$ bits, that the $2^{nd}$ bit + ... $(n+1)^{th}$ will provide a second combination, that the $3^{rd}$ bit + ... $(n+2)^{th}$ a third combination, and so on till the combination formed by the last $n$ bits is obtained. Every one of these combinations is different from all others, except the last, which is identical with the initial or starting combination. As we shall see, this will lead us to define $2^n$ patterns of $2^n$ bits. While the case where the digital elements involved are binary elements has first been discussed, the above method would remain applicable if digital elements capable of assuming P possible values were used. In the latter case, one would have to consider $K=P^n$ combinations, instead of $2^n$ combinations of $n$ digital elements and to use the sequence SU of $n+K$ digital elements to define K patterns of K digital elements.

Figure 2:
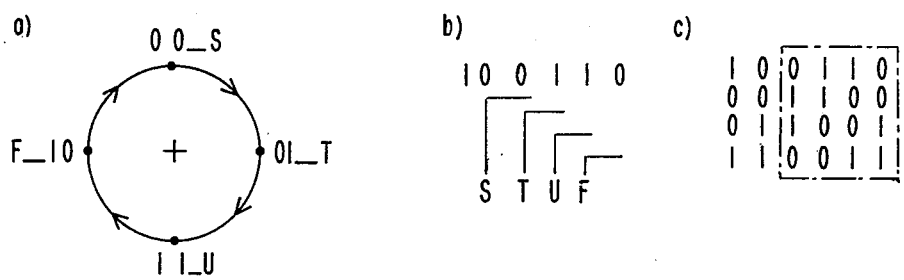
FIGS. 2 and 3 show additional patterns determined from combinations of bit values where $n=2$ and $n=3$ bits, respectively.

Returning to the practical case where the digital elements are bits ($P=2$), FIG. 2 illustrates the family of order $n=2$.

In FIG. 2($a$), the $2^n=4$ combinations of two bits each are shown on the circumference of a circle. FIG. 2($b$) shows the sequence SU of $n+2^n=6$ bits. The first two bits give combination 10, the second and third bits give combination 00, the third and fourth bits give combination 01, the fourth and fifth bits give combination 11, and the fifth and sixth bits give combination 10; the four different combinations have been represented in a purely symbolic manner by the term "STUF". Other starting combinations would result in different sequences being obtained (e.g., 01 would give 011001, etc.). The four possible additional patterns obtained by means of cyclic permutations of sequence SU are shown in FIG. 2($c$).

Whenever an additional pattern is inserted in a message, the latter is interrupted. The pattern being inserted comprises $2^n$ bits and is such that the first of these and the $n-1$ message bits that precede the interruption form the $n$-bit combination which (in the family of order $n$) follows the combination formed by the $n$ message bits which precede the interruption and which make up the starting combination; the pattern of bits to be inserted is well defined since, given the starting combination, each bit successively inserted is such that this bit and the $n-1$ bits that precede it form the $n$-bit combination which follows the combination formed by the $n$ bits preceding the inserted bit. Where $n=2$, the $K=4$ inserted patterns of 4 bits are shown in the area of FIG. 2($c$) which is enclosed in a broken line. If the $n=2$ bits of the message which precede the interruption form the combination 10, then the bits to be successively inserted are 0110; the four combinations successively formed in this example are 00, 01 11 and 10.

Figure 3:
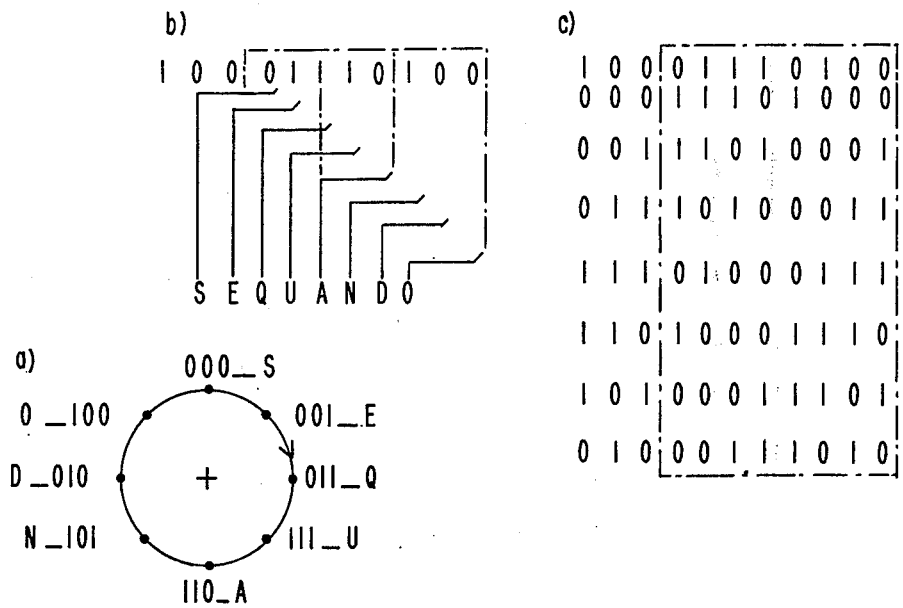

The method of forming the $n$ additional patterns of $n$ bits of the family of order $n$ which has just been described assuming by way of example that $n=2$ is illustrated in FIG. 3 where $n=3$. In FIG. 3($a$), the $2^n=8$ combinations of 3 bits are shown on the circumference of a circle. FIG. 3($b$) shows the sequence SU of $n+2^n=3+8=11$ bits corresponding to the starting combination 100, the various combinations being represented symbolically by the term "SEQUANDO". The $2^n=8$ additional patterns of 8 bits inserted in accordance with each of the $2^n=8$ combinations of $n=3$ bits that precede the interruption of the message are shown in the area of FIG. 3($c$) that is enclosed in a broker line. It will be seen that, in FIGS. 2($c$) and 3($c$), the last $n$ bits of the inserted pattern are identical with the $n$ bits of the message which precede the interruption of the latter. It will also be seen that the tables of FIGS. 2($c$) and 3($c$) are obtained by means of a cyclic permutation of the sequence SU of FIGS. 2($b$) and 3($b$), respectively.

So far, it has been supposed that there existed only one possible manner of classifying the $p^n$ possible combinations of $n$ digital elements capable of assuming P values to successively obtain all combinations as defined above. Actually, several such manners are frequently available. A classification of a given type T corresponds to each of these manners; depending on which manner is selected, the family of order $n$ of type T is obtained. The number M of manners of classifying the $P^n$ combinations is of course dependent upon P and $n$, but is always limited. Where $P=2$ and $n=2$, FIG. 2 shows the classification of the four 2-bit combinations. Where $P=2$ and $n=3$, FIG. 3 shows the $2^3=8$ 3-bit combinations and the circle of FIG. 3($a$) provides one manner of classifying these 8 combinations. As will be explained by way of example in relation to FIG. 17, there exists a second manner which provides a sequence SU different from that of FIG. 3($b$). If $n=2$ ternary digital elements (for example +1, 0, +1) were used, $P^n=3^2=9$ possible combinations would be obtained and there would be $M=5$ different manners of successively classifying the 9 combinations in accordance with the invention. Any manner of classifying the $K=P^n$ combinations of $n$ digital elements capable of assuming P values will always provide a set of K additional patterns of K digital elements corresponding respectively to each of the K starting combinations.

Figure 4:
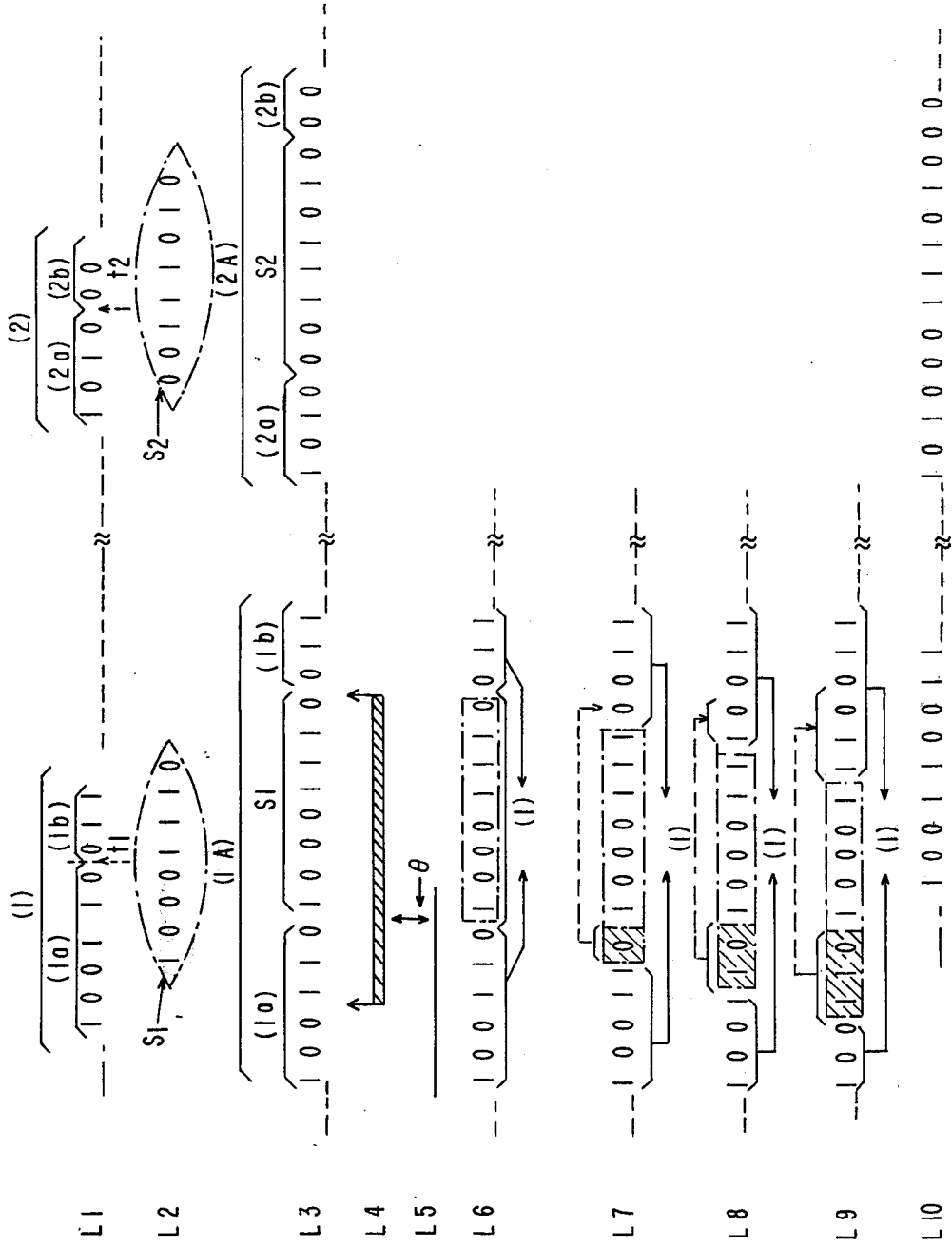
FIG. 4 illustrates a message incorporating several additional patterns and shows the manner in which one of these patterns can be removed from the message.

Referring now to FIGS. 4 and 5, it will be shown that all of the inserted additional patterns can readily be detected and removed regardless of their location within the message. Both of these figures illustrate the case where $n=3$ bits, although no limitation is intended thereby. Line L1 of FIG. 4 represents as a function of time $t$ the successive bits of a message, only two portions of which, designated (1) and (2), are shown. It is assumed that two patterns of additional bits are to be inserted in portions (1) and (2) at times $t1$ and $t2$ respectively. Line L2 shows the two patterns, designated S1 and S2, respectively, which would be inserted as a function of the value of the $n=3$ bits preceding times $t1$ and $t2$. Line L3 shows portions (1) and (2), now designated (1A and 2A), respectively, of the message as modified as a result of the insertion of patterns S1 and S2.

It will now be assumed that the message, as shown in Line L3, is received at one of the nodes of the network where one of the patterns of additional bits must be removed. As explained below, the pattern to be removed can take the form of any sequence of consecutive bits located in that part of the message which is included between the two arrows shown in Line L4. This, of course, implies that a "remove additional pattern" instruction is received not later than time $\theta$. If it is received at time $\theta$, then the only solution is to remove the eight bits which follow this instruction (and will make up pattern S1), as shown in Line L6, in which case the original portion (1) of the message will be obtained. However, if the instruction is received before time $\theta$, removal of the pattern may be advanced one bit (or begin one bit earlier), as shown in Line L7. In this case, the bit 0 in the shaded area, which bit belonged to the original message (Line L1) and is being removed, is again found (as indicated by the arrow) in the right-hand part of the message, so that after removal of the eight consecutive bits the original portion (1) of the message will again be obtained, as in the previous case. Removal of the pattern could be advanced a maximum of $n$ bits; since, in this example, $n=3$, the removal of the $2^n=8$ bits could be advanced a maximum of three bits, as shown in Lines L8 and L9, the result obtained (shown in Line L10) being the same in all cases. This is due to the fact that every inserted pattern ends in the same $n$ bits as the $n$ bits preceding the point where the message is interrupted to allow insertion of the pattern.

It should be observed that not only the bits which make up pattern S1, but also each of the $n$ pattern of $2^n$ bits which are removed 1, 2, ..., $n$ bits earlier, respectively, belong to the family of order $n$ of patterns of additional bits (in this example, where $n=3$, can be verified by referring to table (c) of FIG. 3). If removal is attempted $n+1$ bits earlier than time $\theta$, or after time $\theta$, it will be found that the pattern of $2^n$ bits then formed does not belong to the family of order $n$. A complementary remark of this subject will be made hereafter in relation to FIG. 8.

From the foregoing, it is seen that a "remove additional pattern" instruction can be executed as soon as a sequence of $2^n$ bits identical with one of the $2^n$ patterns of the family of order $n$ is received, said sequence being removed from the message. As shall be seen hereafter, steps can readily be taken to ensure that no portion of the information elements will have a configuration identical with that of any one of said $2^n$ patterns.

Since incoming messages are processed at the various nodes without regard to the meaning of the elements they are comprised of, one or more additional patterns will frequently be inserted in a previously inserted pattern rather than in the information elements, the combination of two or more such patterns being termed herein a block of additional elements or an additional block. Thus, an additional block may consist of "$h$" additional patterns.

As explained below in relation to FIG. 5 where, for purposes of example only, it is assumed that $n=3$, any sequence of $2^n$ bits can be removed from an additional block if an instruction to remove one additional pattern is received at one of the nodes; if an additional block consists of $h$ additional patterns, the entire block can be removed from the message if an instruction to remove $h$ patterns is received.

Considering, for example, portion (2) of the message is shown in Line L1 of FIG. 4, it will be recalled that an additional pattern S2 was inserted therein at time $t2$, the resultant sequence, (2A), being represented in Line L3 of that figure. Both sequences, (2) and (2A), are shown in Line L'1 of FIG. 5. Let us now assume that when this message is received at one of the nodes, the decision is made to insert in pattern S2, at time $t3$, a further additional pattern, S3 (see Line L'2), formed in accordance with the rules previously mentioned. As a result, sequence (2A) becomes sequence (2B) wherein S3 is located between elements S2$a$ and S2$b$ of the earlier pattern S2 which are themselves located between elements (2$a$) and (2$b$) of the original sequence (2).

It will be observed that, as in the case of the insertion of a single pattern, the last $n$ (i.e., the last three) bits of S3 are identical with the $n$ bits of (2A) that precede the point where (2A) was interrupted to allow S3 to be inserted (i.e., the three bits preceding time $t3$), just as the last $n$ bits of S2 are identical with the $n$ bits of (2) that precede the point where (2) was interrupted to permit inserting S2 (i.e., the three bits preceding time $t2$).

As shown in FIG. 5, patterns S2 and S3 form, in sequence (2B), an additional block whose configuration corresponds to twice the configuration of S2. The reason for this will become apparent from FIG. 6, which represents (for $n=3$) the $2^n=8$ combinations of $n=3$ bits positioned around the circumference of a circle. The insertion in a message of the eight consecutive bits which constitute an additional pattern results in each of the eight combinations of three bits being successively formed, starting with the combination which follows the one formed by the three bits which preceded the interruption of the message and ending with the starting combination. This is equivalent to a complete turn around the circle in FIG. 6, regardless of which starting point (or combination) is selected. Thus, the insertion of pattern S2 is sequence (2) of FIG. 5 is represented in FIG. 6 by path F1 which extends around the circle clockwise from point M1 to point M1. Similarly, the insertion of pattern S3 corresponds to path F1 from M1 to M2, where the message is interrupted, then to path F2 from M2 to M2, and then again to path F1 from M2 back to M1, this being equivalent to two complete turns, starting from M1, and therefore to the insertion of two consecutive patterns S2. It will be seen that if a further pattern, S4, were inserted, an additional block equivalent to three consecutive patterns S2 would be obtained. The repetition of the starting pattern (S2 in this example) shows that any sequence of $2^n=8$ bits within the additional block corresponds to an additional pattern which may be removed. Since the additional block, while comprised of $h$ different patterns (in this example, $h=8$) successively inserted in each other, is in fact equivalent to h times the starting pattern (S2 in this example), the last $n$ bits of the repeated starting pattern (S2 in this example), the last $n$ bits of the repeating starting pattern of the block itself will be the same as the $n$ bits that preceded the point where the message was interrupted to allow insertion of the starting pattern.

Accordingly, the removal of any one of the h patterns which constitute the additional block may be advance $n$ bits. In FIG. 5, Lines L'3–L'6 show that a single pattern may be removed if the corresponding instruction is received before time $\theta2$ and that the entire additional block may be removed if the corresponding instruction is received before time $\theta1$. For example, the removal of a single pattern may result in the sequence shown in Line L'4 being eliminated in which case sequence (2A) shown in Line L'5 will again be obtained; if the entire additional block is removed, the two sequences enclosed in broken lines will be eliminated and sequence (2) as shown in Line L'6 will be obtained.

Figure 7:
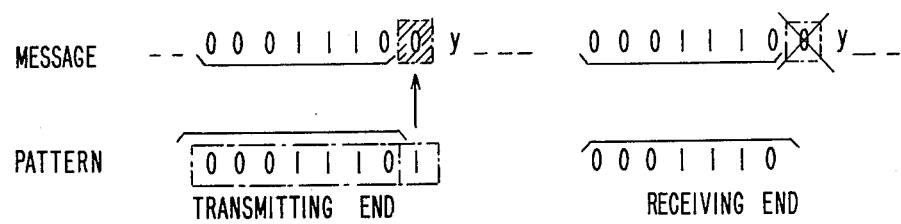
FIG. 7 illustrates the method used to prevent the occurrence in a message of a sequence of information elements identical with an additional pattern.

Referring to FIG. 7, the method used in accordance with the invention to prevent the occurrence in a message of a sequence of bits identical with any one of the $2^n$ patterns of $2^n$ bits of the family of order n will now be described. Only one family need be considered at a time since one specific family would be used for a given transmission.

Whenever the presence in a message about to be transmitted of a sequence of bits identical with the first K-1 elements (i.e., the first $2^n-1$ bits in this example) of one of the additional patterns of $P^n$ digital elements ($2^n$ bits in this example) of the family of order $n$ is detected at the transmitting end of the network, an element (here a bit called the inhibiting bit) is systematically inserted between the detected sequence and the bit, designated bit Y, which follows it in the message, the binary value of the inhibiting bit being the complement of that of the bit which follows the same sequence in the additional pattern. The sequence is thus made different from the pattern regardless of the value of bit Y. The insertion of the inhibiting bit (where $n=3$) is illustrated in the left-hand side of FIG. 7 where it has been assumed that, in the exemplary message 0001110Y..., the presence of the first $2^n-1=7$ bits of a pattern such as 00011101 has been detected; since the eighth bit of this pattern is a 1, a 0, bit (the inhibiting bit) is inserted in the message before bit Y. The inhibiting bits can readily be removed from the messages at the receiving end of the network since any additional patterns will have been removed prior to the messages reaching the receiving end. Whenever the presence in an incoming message of a sequence identical with the first $2^n-1$ bits of a pattern of the family of order $n$ is detected at the receiving end, the bit which follows that sequence, that is, the inhibiting bit inserted at the transmitting end, is systematically removed from the message. This is illustrated in the righthand part of FIG. 7.

Figure 8:
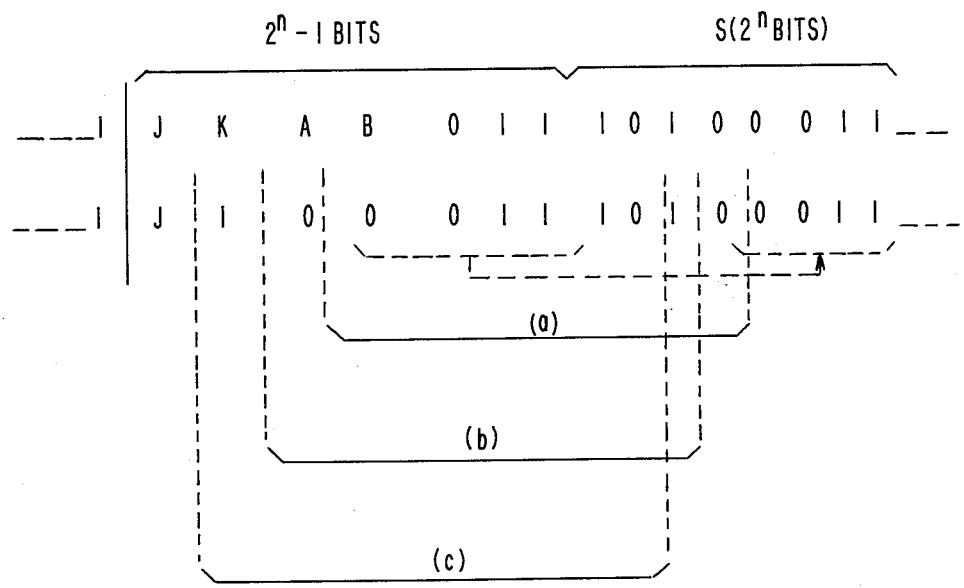
FIG. 8 illustrates an alternative method of removing an additional pattern from a message.

FIG. 8 illustrates an alternative method of removing an additional pattern from a message. The group of bits consisting of the $2^n$ bits of a pattern inserted in a message and of the $2^n-1$ bits which precede them, whether or not the latter are information bits, may happen to include one or more sets of $2^n$ consecutive bits identical with the $2^n$ bits of some pattern of the family of order $n$ (in this example, $n=3$). In such a case, any one of said sets can be removed as a pattern from the group with no detrimental effects on the original message elements. Of course, if digital elements capable of assuming P possible values were involved, the group would consist of the $K=P^n$ elements of the pattern and of the K-1 elements which precede it, and several sequences of the $P^n$ elements identical with one or more patterns might be defined. This is illustrated in FIG. 8 for $n=3$ bits. As shown, pattern S of $2^n$ bits and the $2^n-1$ bits which precede them, namely, bits J, K, A, B, O, 1, 1 (the last three serving to define the pattern in accordance with FIG. 3(c) ), constitute one of the groups mentioned above. Assuming, by way of example, that the values of bits K, A, B are 1, 0, 0 respectively, the sequence 1000111 ... 1 will be obtained. This sequence might be found to include one or more sets of $2^n=8$ consecutive its identical with one or more of the eight possible patterns, three such sets, designated (a), (b), (c), being shown in FIG. 8. Any one of the these sets can, if desired, be removed as a pattern without perturbing the original message elements since, as shown, the information bits being removed as part of the set are exactly the same as the remaining bits of pattern S. For example, the elimination as part of set (a) of information bits, 0, 0, 1, 1, would have no effect on the original message since bits 0, 0, 1, 1 of the pattern would not be removed. It should be noted that the groups of bits cannot include bit 1 because, as mentioned earlier, provision is made to prevent the occurrence of any sequence of $2^n$ consecutive information bits that would be identical with an additional pattern.

The present method of inserting additional patterns is very flexible and can be adapted as necessary to meet external requirements while retaining its own characteristics.

For example, assume that the message to be transmitted is such that, under normal operating conditions, it will never include sequences "000" and "111", both of which would only be used internally for control and similar purposes. If so, the method of the present invention should neither cause any of said sequences to accidentally occur in a message, nor interfere with the detection of such sequences, if included in the message for internal purposes.

FIG. 9 shows the manner in which the $2^n=8$ combinations of 3 bits of the family of order $n=3$ can be used to meet these requirements. Referring to the diagram of FIG. 9(a), it will be seen that if the path indicated by arrows is followed (instead of moving clockwise from one combination to another as in FIG. 3(a) ), an additional pattern, if inserted in a message that initially contained no sequences "000" or "111", will comprise no such sequences, or, if inserted in a message portion wherein they already existed, will consist of a of 0's or of 1's, as the case may be. FIG. 9(b) is the sequence of bits providing the $2^n-2=6$ defining combinations other than 000 and 111 the $2^n-2=6$ patterns of $2^n-2$ bits are shown in FIG. 9 (c), which is similar to FIG. 3 (c). FIG. 9(d) shows the two patterns defined by combinations 000 andl 111.

A further example of the flexibility of the present invention is given hereafter. The $P^n$ (here $2^n$) combinations of n digital elements (here n bits) of a family of order n may be subdivided into a number of groups, with groups Gi comprising Ki combinations. To each of the Ki combinations corresponds one of the Ki additional patterns each of which consists of Ki elements (here Ki bits). However, within each group, the transition from one combination to another must conform to the general rule previously given, namely, the element (the bit, in this example) being inserted must be such that it will constitute, together with the $n-1$ bits preceding it, the combination which follows the one formed by the $n$ bits preceding said element. Theoretically, each of said groups need not comprise the same number of combinations. In practice, however, it is desirable that all groups should contain an identical number of combinations as this will result in a simplification of the circuitry required to implement the invention, the reason being that groups comprised of different numbers of combinations would lead to different numbers of additional patterns and, therefore, to patterns of different lengths since, as mentioned earlier, a group of $Ki$ combinations corresponds to $Ki$ additional patterns of $Ki$ bits each.

This technique may have to be used in many cases, one of which is discussed below, by way of example, in relation to FIG. 10.

In this example, the problem to be dealt with is assumed to be the same as that discussed in relation to FIG. 9, except that the sequences involved are "0000" and "1111" instead of "000" and "111". This implies that some of the sixteen 4-bit combinations of the family of order $n=4$ will be used.

In accordance with the "normal" process described in relation to FIGS. 2 (for $n=2$) and 3 (for $n=3$), these 16 combinations would define 16 16-bit additional patterns, two of which are shown in FIG. 10(c).

If the method described in connection with the example of FIG. 9 were followed to eliminate sequences "0000" and "1111", fourteen of these combinations, which would then define fourteen 14-bit additional patterns, would be used. As a result, a significant number of circuits and, in particular, of register positions, would be required.

To overcome this difficulty, the 14 4-bit combinations are subdivided into two groups of 7 4-bit combinations defining two sets of 7 7-bit additional patterns. The first group is shown in FIG. 10 ($b1$) and the seven 7-bit additional patterns which they define are shown enclosed by a broken line in FIG. 10($c1$). The second group is shown in FIG. 10($b2$) and defines the seven patterns enclosed by a broken line in FIG. 10($c2$). The specific patterns defined by combination 0000 and 1111 consist, as in the case discussed in relation to FIG. 9, of repeated 0 and 1 bits, respectively, and could be comprised of seven 0 bits and seven 1 bits, respectively. Thus, the subdivision technique makes it possible to obtain 16 additional patterns of identical length and to prevent both the accidental occurrence of a sequence "0000" or "1111" in a message and the modification of such sequences where initially included in a message for control or other internal purposes (the sequences shown in FIG. 10($d$) which consist of repeated 0 or 1 bits do not interfere with the detection of said sequences "0000" or "1111").

The circuitry used to implement the method of inserting and removing additional patterns in accordance with the present invention will now be described.

Figure 11:
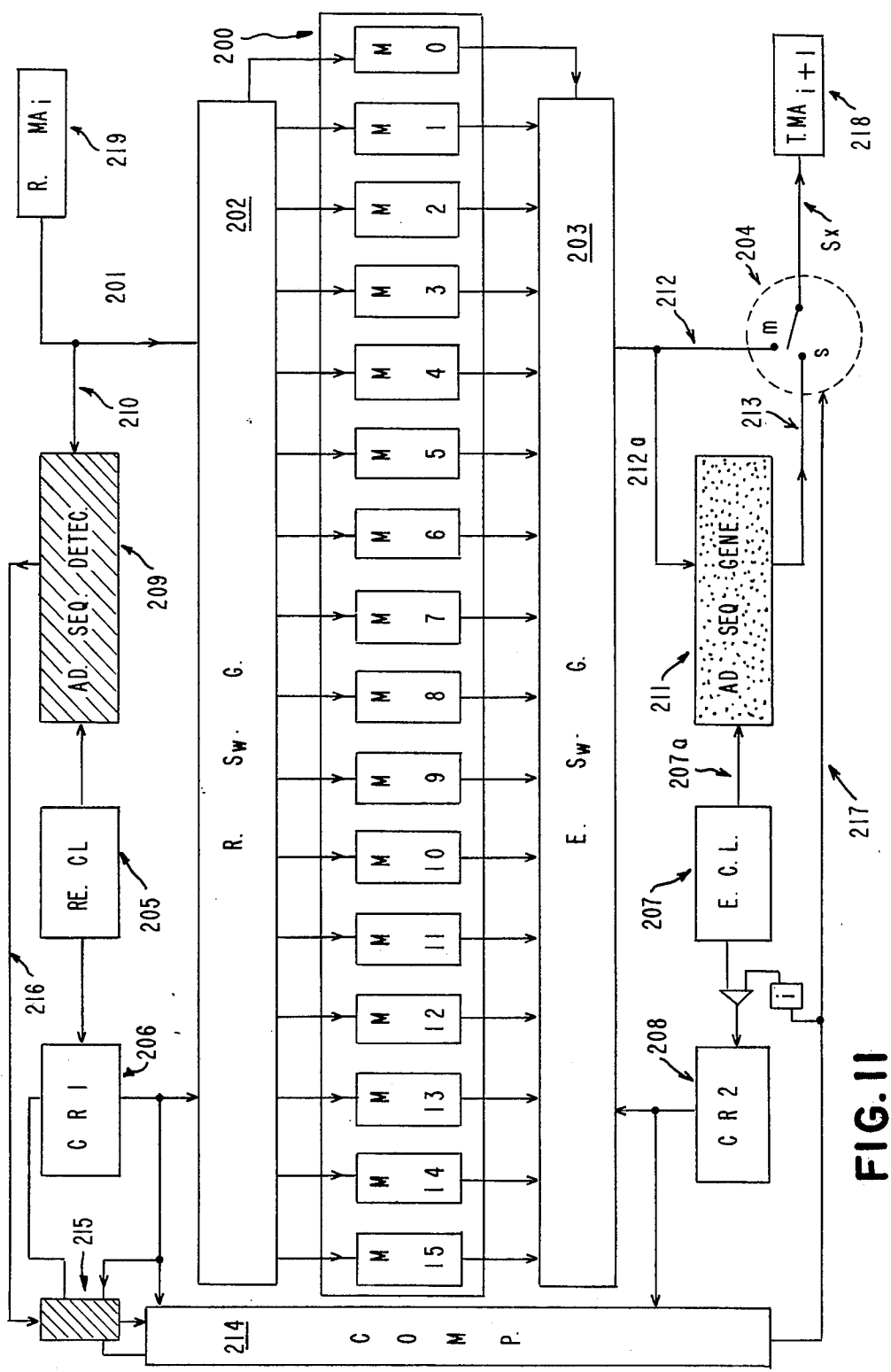
FIG. 11 is a schematic diagram illustrating the interface between the links associated with one the nodes of the network.

FIG. 11 illustrates the interface between two consecutive links $MA_i$ and $MA_{i+1}$, of the transmission network. The receiver 219 associated with link $MA_i$ and the transmitter 218 associated with link $MA_{i+1}$ form no part of the invention and are assumed to operate at different speeds.

The interface unit of FIG. 11 includes circuits 211 and 209 which are respectively used to insert and to detect additional patterns in accordance with the invention. These circuits will be described in greater detail in relation to FIGS. 14–21. Since one of the main objects of the invention is to compensate for variations of the signaling rate in a transmission network, it is believed necessary to describe the operation of such an interface in general terms, where the receiver and the transmitter associated with a given node do not operate at the same speed, before describing those of the interface circuits which are used to implement the invention.

The interface further includes the buffer B.R. of FIG. 1. This buffer consists of independent storage positions 200 which may be of any known type (latches, ferrite cores, etc.), provided only that the speeds at which the information elements are read in or out of these positions are compatible with the signaling rates on the various links of the network. The buffer shown by way of example in FIG. 11 has 16 storage positions designated M0-M15. Incoming message elements are read in these positions under control of a set 202 of switching gates (R.Sw.G.); similarly, out going message elements are read out of these positions under control of a set 203 of switching gates (E.Sw.G). Receive clock (Re.CL) circuits 205 and transmit clock (E.CL) circuits 207 are synchronized with the signaling rates on links $MA_i$ and $MA_{i+1}$, respectively. Counters CR1 at 206 and CR2 at 208 count the information elements read in or out of buffer positions 200, respectively. A comparator 214 compares the counts of CR1 and CR2 and determines the instant at which an additional pattern must either be inserted (due to the signaling rate on link $MA_{i+1}$ exceeding that on $MA_i$) or removed (due to the signaling rate on $MA_i$ exceeding that on $MA_{i+1}$).

In the latter case, circuits 209 permit detecting an additional pattern. Circuits 215 store the count reached at that time by counter CR1, said count serving to indicate those of buffer positions 200 wherein the additional pattern is stored.

If the signaling rate on link $MA_{i+1}$ exceeds that on link $MA_i$, the circuits 211 mentioned earlier are used to generate additional patterns. Note that the output of circuits 211 is connected to a switch 204.

Figures 12, 12A:
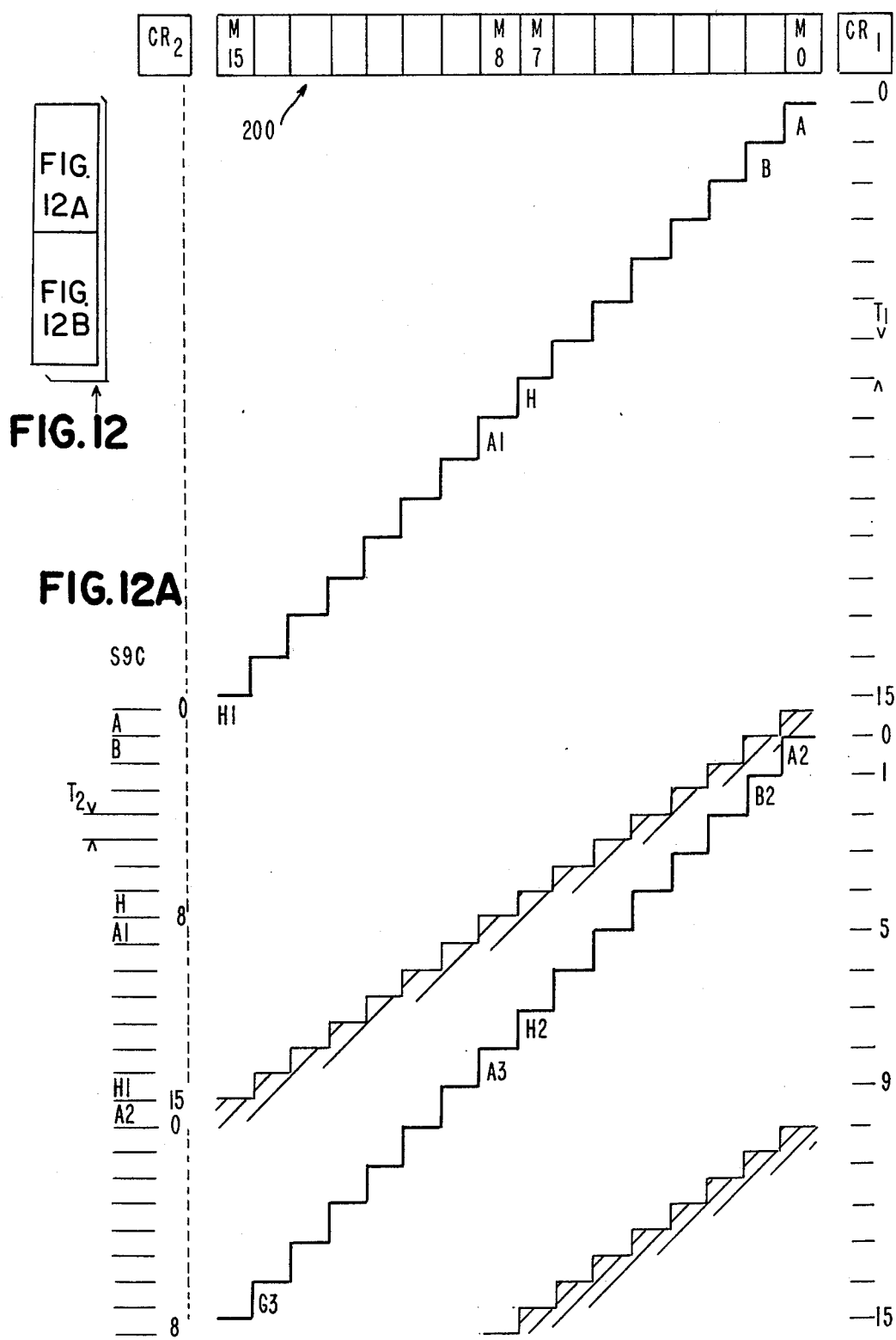
FIG. 12, consisting of FIGS. 12A and 12B, illustrates the timing relations of the circuitry in FIG. 11.
Figure 12B:
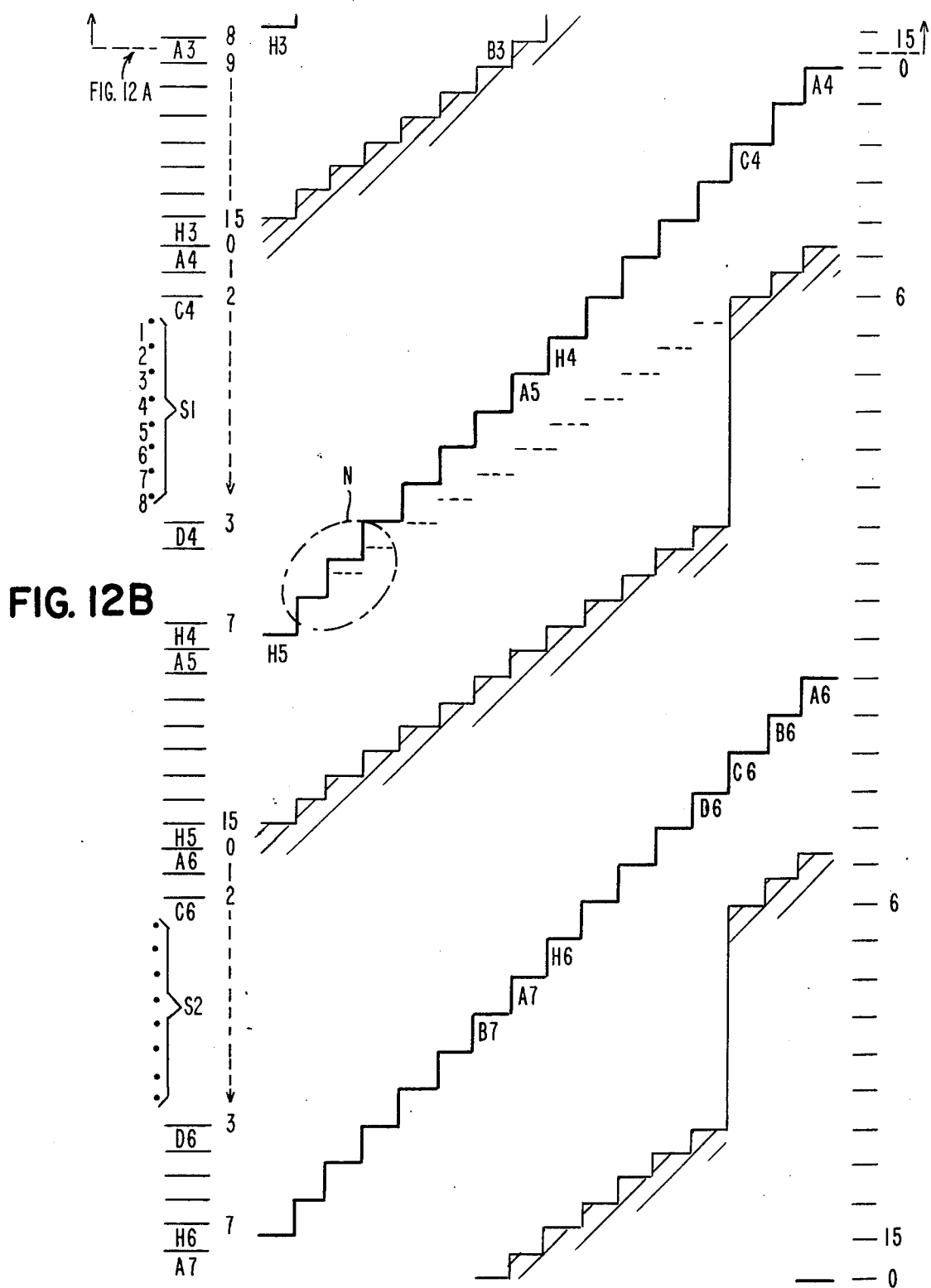
Figure 13B:
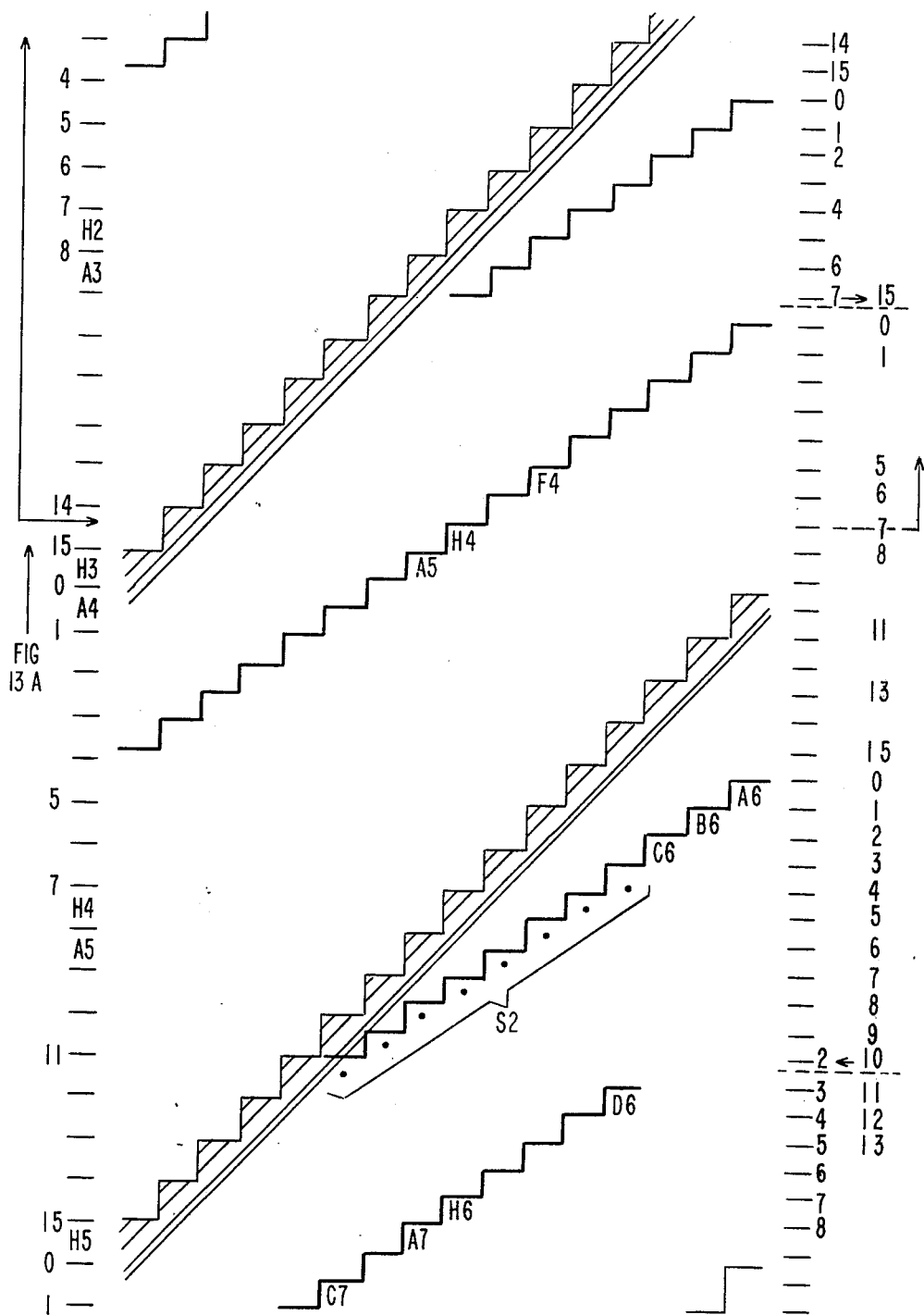
FIG. 13, consisting of FIGS. 13A and 13B, is a timing diagram similar to that of FIG. 12.

The operation of the interface of FIG. 11 will now be described in relation to the insertion and to the removal of an additional pattern. Reference will be made in this connection to FIGS. 12 (consisting of FIGS. 12A and 12B, which should be assembled as shown in FIG. 12) and 13 (consisting of FIGS. 13A and 13B, which should be assembled as shown in FIG. 13), both of which illustrate the timing relations of the circuitry in FIG. 11 during insertion and during removal of such a pattern, respectively.

Concerning the first case (insertion), it will be assumed that messages are received at a first rate $R1=1/T1$ and transmitted at a second rate $R2=1/T2$, with $R2>R1$ or $T1>T2$ (in this example, $T1=3T2/2$). The receive clock pulses (of period T1) and the successive counts of counter CR1, which operates under control of these pulses, are shown in the right-hand portion of FIG. 12. The transmit clock pulses (of period T2), the successive counts of counter CR2 and the elements sent over line $Sx$ are shown in the left-hand portion of FIG. 12 while the contents of buffer positions 200 are represented in the center of the figure.

Since $T2<T1$, the readout will begin when the buffer is filled or nearly filled. The successive input and output operations are represented by the heavy and light lines, respectively, in the center of FIG. 12. Unless the outputs are acted upon, a time will come when, as shown in area N of FIG. 12B, the inputs and the outputs will interfere with each other. This, however, will not happen, as explained hereafter. When the difference between the count values of counters CR1 and CR2 reaches a predetermined minimum value (here 6−2=4), comparator 214 (FIG. 11) sends on line 217 a signal which interrupts the buffer readout operation and inhibits counter CR2 while generator 211 generates an additional pattern, switch 204 being set to position $s$. In this example, the pattern is assumed to be defined by one of the 3-bit combinations of the family of order $n=3$ and would therefore comprise $2^n=8$ bits. As mentioned earlier, this pattern is defined by the last $n$ message elements received from link $MA_i$ and transmitted to link $MA_{i+1}$ (here the three bits designated A4, B4, C4); the message elements, including these three elements, are sent to generator 211 via line 212a. As FIG. 12B shows, the readout of buffer positions 200 is interrupted while additional pattern S1 is being applied to transmitter 218 (FIG. 11) via line Sx. In this example, another additional pattern, S2, would have to be inserted once message element C6 has been transmitted.

Referring now to the second case (removal of an additional pattern), it will be assumed that the message so formed (including additional patterns S1 and S2) is transmitted over link $MA_{i+1}$ at a signaling rate R2, is received at the end of that link and is then retransmitted over a link $MA_{i+2}$ at a signaling rate $R3=1/T3<R2=1/T2$. It is apparent that this case is the converse of the previous one since the signaling speed on link $MA_{i+1}$ is now higher than that on link $MA_{i+2}$.

FIG. 13 is similar to FIG. 12. The receive clock pulses (of period T2) and the successive counts of counter CR1 are shown in the right-hand portion of FIG. 13 while the transmit clock pulses (of period T3), the successive counts of counter CR2 and the elements sent via output line Sx to the next link, $MA_{i+2}$, are shown in the left-hand portion of the figure; the contents of buffer positions 200 are represented in the center of FIG. 13. Since T3>T2, buffer positions 200 can be read out as soon as the message transmitted over the previous link, $MA_{i+1}$, is received. The successive input and output operations are represented by the heavy and light lines, respectively, in the center of FIG. 13. Unless the inputs are acted upon, a time will come when, as shown in area N' of FIG. 13A, the inputs and the outputs will interfere with each other. As explained hereafter, this will not occur. As soon as the difference between the count values of counters CR1 and CR2 reaches a predetermined maximum value providing a safety margin (here 11 at Q), the decision is made to remove the next incoming additional pattern. As previously mentioned, removal of the pattern can be advanced $n$ (here $n=3$) bits, thereby providing an extra safety margin. Thus, bits A4, B4, C4, and the five bits that follow them, $\overline{1}, \overline{2}, \ldots, \overline{5}$ (since $\overline{6}, \overline{7}, \overline{8}$ are identical with A4, B4, C4, respectively) can be removed. Accordingly, the $2^n=8$ bits A4, ... $\overline{5}$ are removed from the corresponding buffer positions 200 and replaced by the 8 bits which followed them, i.e., $\overline{6}, \overline{7}$, etc.. As soon as bit $\overline{5}$ is received, 8 is subtracted from the count value of counter CR1; in this example, the count value becomes 7−8=−1=15, and $\overline{6}$ is stored in buffer position M0 wherein A4 was previously stored. Thereafter, the bits continue to be stored in positions 200 in the usual manner. It is apparent from FIG. 13B, which duplicates the lower portion of FIG. 13A, that additional pattern S2 will also have to be removed.

An important remark must be made at this point. If signaling rate R3=1/T3 (equal to R1, in this example) had been much lower than R2, interference area N' would have been encountered much earlier, before additional pattern S1 had been received. However, this would have created no problem. S1 was inserted at the interface between links $MA_i$ and $MA_{i+1}$, and if R3 is much lower than R2, then R3 is lower then R1 (signaling rate on $MA_i$). But this implies that the signaling rate at the input T1 of the network (FIG. 1), which must be lower than the lowest rate used in the entire network, is lower than both R3 and R1. As a result, the message transmitted over $MA_i$ would already include additional patterns inserted at previous nodes, which means that some of the bits A, ... H, A1, ... H1, ... comprising the message sent over $MA_i$ would constitute one or more additional patterns transmitted over the successive links. Consequently, before additional pattern S1 is received, the message would be found to include additional patterns which would be removed therefrom at the interface between $MA_{i+1}$ and $MA_{i+2}$. There would therefore be no problem.

A second important remark must be made. Since removing an additional pattern is the same as not sending it to the next link, a pattern can only be removed if its transmission to the next link has not yet begun. Accordingly, as soon as a pattern is received, the count value of counter CR1 and the same value minus 8 are both stored in circuits 215 (FIG. 11), thereby defining the buffer positions 200 wherein the pattern is stored. Upon receipt of a "remove additional pattern" instruction, comparator 214 determines whether the count value of counter CR2 is within the two limits stored in circuits 215. If it is, this means that the pattern is being read out of buffer positions 200 to be transmitted to the next node; if it is not, this means that the pattern is available and can be removed as previously explained.

Possible implementations of circuits 211 and 209 (FIG. 11) which are used to generate and to detect additional patterns, respectively, will now be described.

Figure 14:
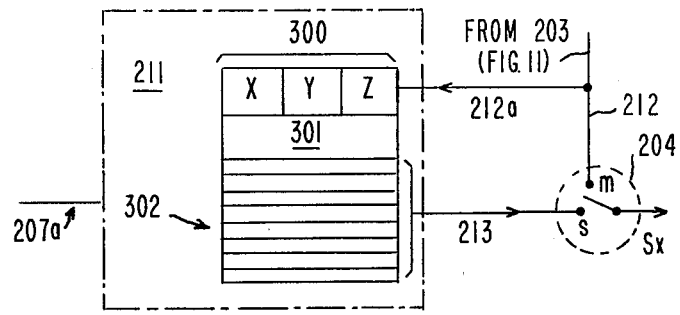
FIG. 14 is a schematic diagram illustrating a circuit for generating additional patterns.

The additional pattern generator 211 illustrated in FIG. 14 includes a register 300 with $n$ positions (in this example, $n=3$), a memory 302 storing words corresponding to the $2^n$ (8 in this example) additional patterns defined by the $2^n$ combinations of values in register 300, and logic circuits 301 for addressing any one of the words stored in memory 302.

The additional pattern to be inserted in a message can be determined at any time since the $n$ bits that precede the pattern are known. The corresponding word stored in memory 302 is then read under control of the clock pulses received via line 207a, thereby providing on line 213 the additional pattern which is applied to line Sx via switch 204, then set to $s$. In this example, the words stored in memory 302 would be the patterns enclosed by a broken line in FIG. 3(c). A device of this type can generate any family of additional patterns.

Figure 15:
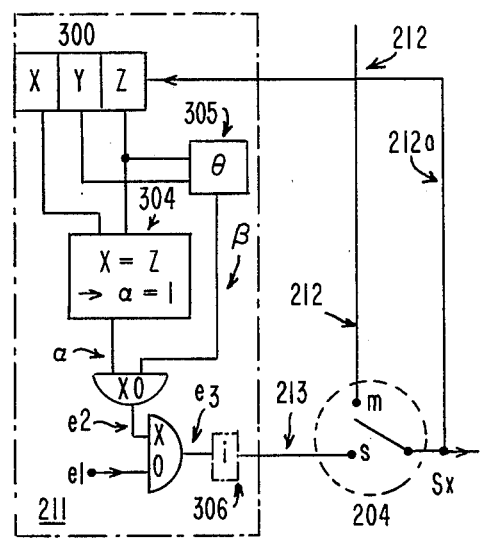
FIG. 15 is a schematic diagram illustrating another version of the circuit of FIG. 14.
Figure 16:
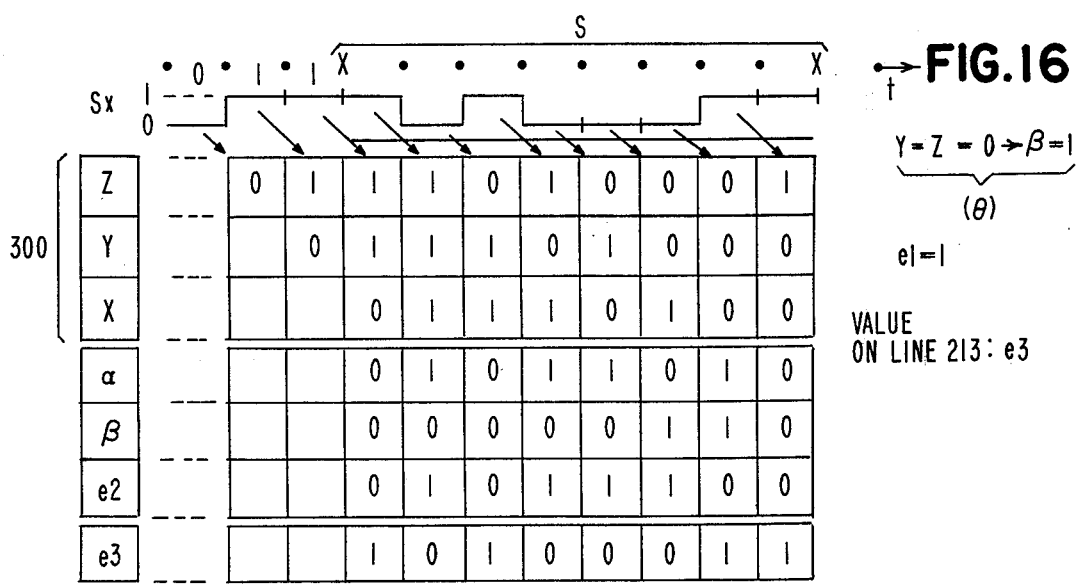
FIG. 16 is a timing diagram illustrating the operation of the circuit of FIG. 15.

An alternative generator 211 is illustrated in FIG. 15 for $n=3$. As previously mentioned, and as will be apparent from FIG. 3(b), any of the bits of an additional pattern is such that it forms, together with the $n-1$ bits that precede it, the $n$-bit combination which follows, in the family of order $n$, the combination formed by the $n$ bits which precede that bit. In the device of FIG. 15, each additional pattern is formed bit by bit in accordance with the above process instead of being read out of a memory as in the arrangement of FIG. 14. Line 212a is connected to line Sx instead of Line 212; this enables the register 300 to receive the message and, when the transmission of an additional pattern is initiated, to receive each successive bit of the pattern being transmitted and therefore to define the next bit. It will be appreciated that the foregoing applies regardless of the value of $n$.

With the device of FIG. 15, the generation of an additional pattern defined by the 3-bit combinations shown in FIG. 3($a$), requires that the logic function ($\theta$) be such that, if Y=Z=0, $\beta$=1 and that control el be on, in which case the output value $e3$ is obtained on line 213 (inverter 306 is bypassed). The diagram of FIG. 16, wherein it has been assumed that the $n$=3 bits of the message which precede the insertion of the additional pattern are 011, shows the changes undergone as a function of time by the values stored in register positions X, Y, Z and by $\alpha$, $\beta$, $e2$, $e3$, the sequence of bits then present at output $e3$ being the inserted additional pattern S since switch 204 is set to $s$ as soon as the decision to insert a pattern has been made.

Figures 17, 18:
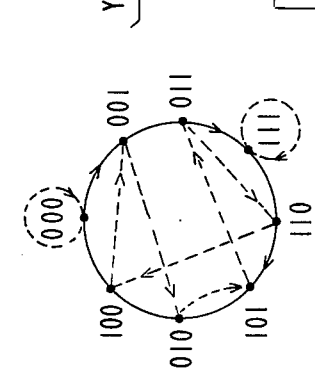
FIGS. 17 and 18 illustrate alternative uses of the circuit of FIG. 15.

If it is desired to generate the additional patterns defined by the combinations of the family of order $n$=3 in the order shown in FIGS. 17($a$) and 17($b$) using the device of FIG. 15, all that is required is to put $e1$=1, to make logic function ($\theta$) such that, if Y=Z=0, $\beta$=1 and to apply $\overline{e3}$ (inverter 306 being on) to line 213. Assuming that the starting combination is 000, the transmitted additional pattern is shown in the column headed $\overline{e3}$ of the table in FIG. 17($c$). Any other starting combination could of course be used (for example, starting combination 101 would provide pattern 11000101, as shown in the table of FIG. 17($c$)).

To generate the additional patterns of the sub-family of order $n$=3 previously mentioned in relation to FIG. 9, all that would be required would be to put $e1$=0, to make ($\theta$) such that, if Y=Z=0, $\beta$=1, and to send the value $e3$ on line 213, as illustrated in FIG. 18. The table associated with FIG. 18 shows that any combination "111" or "000" defines an additional pattern comprised of six 1's or six 0's and that the other 3-bit combinations define the patterns of FIG. 9($c$).

From the foregoing, it will be apparent that the device of FIG. 15, like the device of FIG. 14, is particularly flexible and requires a limited number of circuits.

Figure 23:
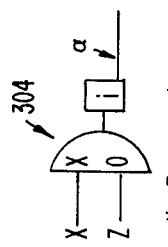
FIGS. 22-25 illustrate possible implementations, in accordance with known methods, of the logic circuits shown in the preceding figures.
Figure 24:
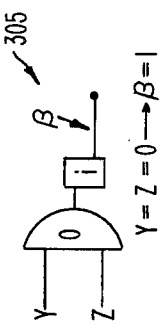
Figure 25:
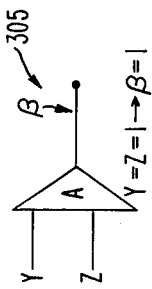

Circuits 304 and 305 of FIG. 15 may be of the conventional types illustrated in FIGS. 23 and 24, 25.

The implementation of the circuits 209 of FIG. 11, which are used to detect additional patterns, will now be described.

Figure 19:
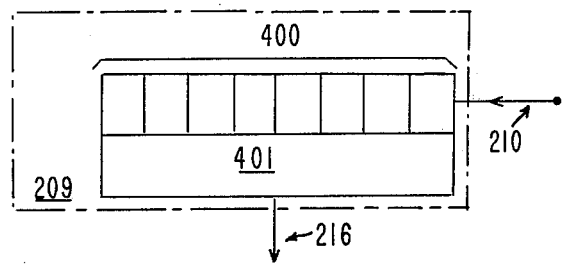
FIG. 19 is a schematic diagram illustrating a circuit for detecting additional patterns.
Figure 22:
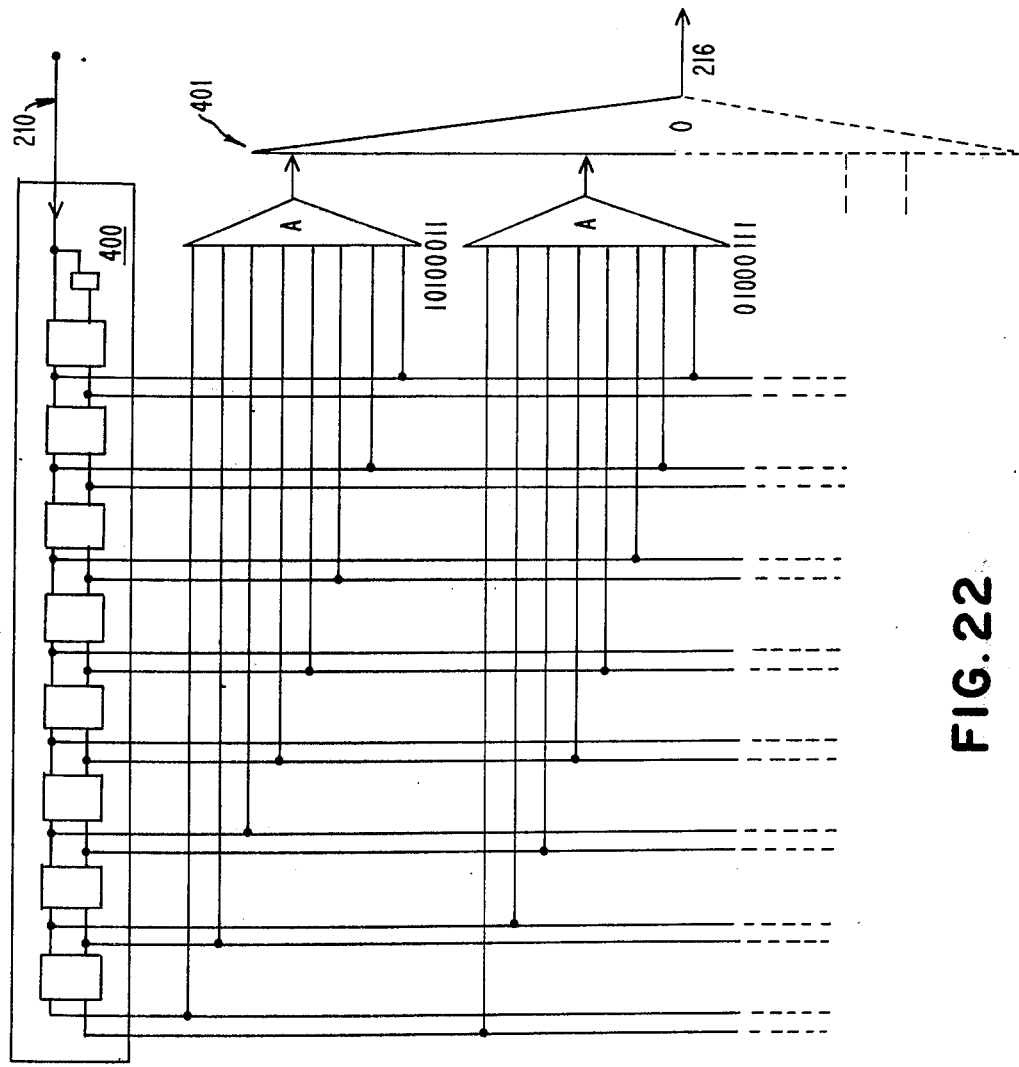

The circuits 209 shown by way of example in FIG. 19 include a register 400 comprising $2^n$ positions in which the successive bits of an incoming message are stored via line 210. The outputs from these positions are fed to logic circuits 401 which allow, for each of the $2^n$ different combinations of bit values defining the $2^n$ additional patterns of the family of order $n$, to place on line 216 a signal indicating that one of these patterns has been received. Logic circuits 401 may be of the conventional type shown in FIG. 22, which illustrates two of the $2^n$=8 AND circuits with $2^n$=8 inputs each whose outputs are connected to an OR circuit whose output is in turn applied to line 216.

Figure 20:
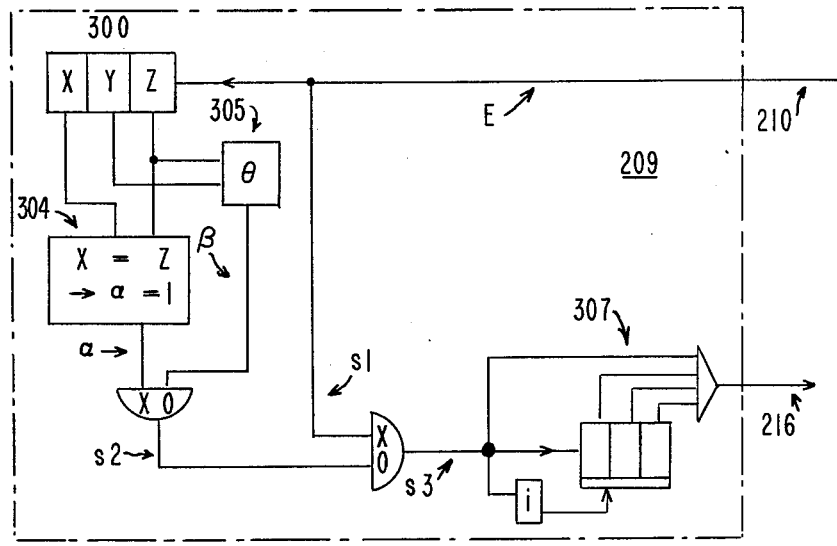
FIG. 20 illustrates another version of the circuit of FIG. 19.

FIG. 20 illustrates an alternative version of circuits 209. This version is very similar to the additional pattern generator 211 of FIG. 15 and includes the register 300, the circuits 304 and 305 and the Exclusive OR circuit with $\alpha$ and $\beta$ as inputs that are shown in the latter figure. However, the output of this circuit is applied via a line $s2$ to one of the inputs of a second Exclusive OR circuit to the other input of which are fed the message elements being received via lines 210 and $s1$. The output of the second Exclusive OR circuit is fed via a line $s3$ to a counter 307. This output is a 1 when the element being received forms with the elements which preceded it the appropriate combination of the family of order $n$. Counter 307, which is reset to zero whenever a 0 is present on line $s3$, counts these 1's. When $2^n$=8 of these have been counted in succession, this means that an additional pattern has been received. Upon counting the eighth bit, counter 307 causes a signal indicating that an additional pattern has been received to be applied on line 216.

Figure 21:
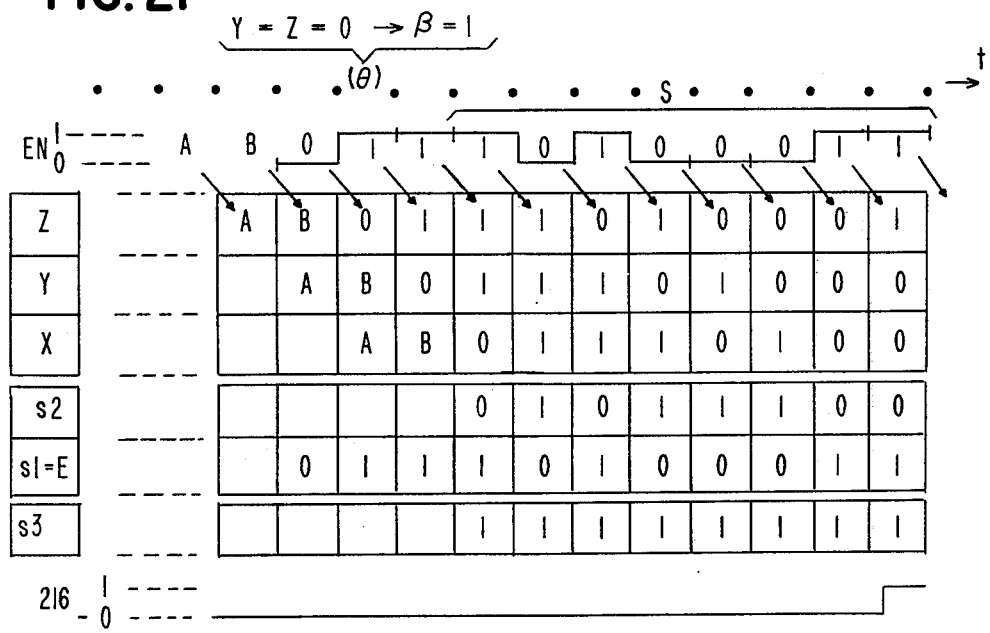
FIG. 21 is a timing diagram illustrating the operation of the circuit of FIG. 20.

The diagram of FIG. 21 illustrates the operation of the circuits of FIG. 20. The diagram shows the changes undergone as a function of time by the values stored in register positions X, Y, Z and by those applied on lines $s1$, $s2$, $s3$ and 216. In FIG. 21, it has been assumed (no limitation being implied) that the message being received comprises information elements A, B, 0, 1, 1 followed by additional pattern S defined in accordance with the method of the present invention. The circuits of FIG. 20 can readily be adapted to detect additional patterns belonging to the various families of order $n$ for different values of $n$.

A few additional applications which would only involve minor changes in the method and devices of the present invention are mentioned below.

Additional patterns could be used to separate the successive portions of a message, thereby facilitating selection at the receiving end in the case, for example, of a multiplex communication system. It would also be possible to use short additional patterns to separate the characters within a message. Since messages are not perturbed by the additional patterns inserted therein, several patterns of different types could be inserted in a message to serve different purposes; thus, patterns of one type could be used to compensate for variations of the speed at which a message is transmitted over the successive links of a network, and patterns of another type (either in accordance with the invention and belonging to another family, or developed by means other than those described herein) could be employed to separate the various portions of the message.

While the invention has been particularly shown and described with reference to a particular embodiment thereof, it will be understood by those skilled in the art that the foregoing and other changes in form and detail may be made therein without departing from the spirit and scope of the invention.

What is claimed is:

1. The method of inserting a plurality of additional patterns of elements into a message comprising a plurality of said elements, said message being transmitted from a sending device through a plurality of communication links to a receiving device, so that any node may insert said additional patterns into said message at any time and at any place within said message and so that said additional patterns may be selectively deleted from said message by any node, as necessary to make the number of elements available for transmission over each of said links correspond to an element transmission rate of said each of said links, said method comprising the steps of:

1. modifying said message at said sending device so that a sequence of said elements of said message does not contain a pattern of $Ki$ elements identical to any one of a plurality of patterns of $Ki$ additional elements which may be inserted at one of said nodes prior to transmission over one of said links, where $Ki$ is an integer greater than zero but not greater than K, where K and P are integers, and where $K = P^n$ defines a family of order $n$ comprised of K possible combinations of $n$ of said elements, each of said elements being capable of assuming P values;
2. storing said elements comprising said message in a buffer as said elements become available from said sending device;
3. transmitting said elements, one at a time, from said buffer over said one of said links;
4. detecting when the number of said elements available for transmission from said buffer is less than a predetermined number;
5. generating one of said patterns of $Ki$ additional elements to be transmitted following $n$ of said elements from said buffer, the last $n$ of said elements of said one of said patterns of $Ki$ additional elements being identical to said $n$ of said elements from said buffer, and wherein one of said K possible combinations of $n$ elements is formed by each element $i$ of said one of said patterns of $Ki$ additional elements with $n-1$ of said elements which precede said element $i$, and where $i$ is an integer greater than zero and not greater than $Ki$; and
6. transmitting said pattern of $Ki$ additional elements following said $n$ of said elements from said buffer.

2. The method of claim 1 further comprising the steps of:
7. receiving at a node, said elements comprising said message including at least one of said patterns of $Ki$ additional elements at said transmission rate of said one of said links;
8. storing said elements comprising said message including said at least one pattern of $Ki$ additional elements in a buffer at said node;
9. transmitting said elements, one at a time, from said buffer at said node, to another link at a transmission rate which is higher than said transmission rate of said one of said links;
10. detecting when the number of said elements available for transmission from said buffer at said node is less than a predetermined number;
11. generating another one of said patterns of $Ki$ additional elements to be transmitted following $n$ of said elements from said buffer, said $n$ of said elements from said buffer being any portion of said one of said patterns of $Ki$ elements, the last $n$ of said elements of said another one of said patterns of $Ki$ additional elements being identical to said $n$ of said elements from said buffer, and wherein one of said K possible combinations of $n$ elements is formed by each element $i$ of said another one of said patterns of $Ki$ additional elements with $n-1$ of said elements which precede said element $i$, and where $i$ is an integer greater than zero and not greater than $Ki$; and
12. transmitting said another one of said patterns of $Ki$ additional elements following said $n$ of said elements from said buffer at said node.

3. The method of claim 1 further comprising the steps of:
7. receiving at a node, said elements comprising said message including at least one of said patterns of $Ki$ additional elements at said transmission rate of said one of said links;
8. storing said elements comprising said message including said at least one pattern of $Ki$ additional elements in a buffer at said node;
9. transmitting said elements, one at a time, from said buffer at said node, to a receiving device at a transmission rate which is lower than said transmission rate of said one of said links but at a rate which is not lower than a rate at which said elements comprising said message are being transmitted from said sending device;
10. detecting when a predetermined number of said elements remain stored in said buffer at said node and generating a delete pattern signal causing at least one of said additional patterns of $Ki$ additional elements to be deleted from said buffer at said node to avoid overflow of said buffer at said node;
11. detecting a complete one of said patterns of $Ki$ additional elements in said buffer; and
12. deleting said detected pattern of $Ki$ additional elements;
whereby the number of elements stored in said buffer at said node is reduced without loss of any of said elements comprising said message.

4. The method of claim 2 wherein $Ki$ is equal to K and wherein $n$ is greater than two whereby more than K different patterns can be generated, each pattern having the property that one of said K possible combinations of $n$ elements is formed by each element $i$ of said K elements of said pattern with said $n-1$ of said elements which precede said element $i$, and wherein said pattern of step 1 of $Ki$ additional elements which may be inserted and said pattern of step 5 of $Ki$ additional elements to be transmitted following $n$ of said elements from said buffer, are members of a group of patterns of a classification $m$.

5. The method of claim 3 wherein $n$ is greater than two and P is equal to two, and wherein said plurality of patterns of $Ki$ additional elements comprise at least two groups of said patterns of $Ki$ additional elements.

6. The method of claim 5 wherein one of said groups of said patterns of $Ki$ additional elements consists of one pattern of $Ki$ additional elements.

7. A communication system which provides for additional patterns of elements to be inserted into a message comprising a plurality of said elements, said message being transmitted from a sending device through a plurality of communication links to a receiving device, so that any node may insert said additional patterns into said message at any time and at any place within said message and so that said additional patterns may be selectively deleted from said message by any node, as necessary to make the number of elements available for transmission over each of said links correspond to an element transmission rate of said each of said links, said system comprising:
means for storing said elements comprising said message in a buffer as said elements become available for transmission;
transmitting means connected to said buffer for transmitting said elements, one at a time, from said buffer over one of said links;
means connected to said storing means and connected to said transmitting means for detecting when the number of said elements available for transmission from said buffer is less than a predetermined number;

a pattern generator having an output connected to said transmitting means and an input connected to said buffer, said generator being controlled by said detecting means for generating a pattern of $Ki$ additional elements to be transmitted following $n$ of said elements from said buffer, where $Ki$ is an integer greater than zero but not greater than K, where K P are integers, and where $K=P^n$ defines a family of order $n$ comprised of K possible combinations of $n$ of said elements, each of said elements being capable of assuming P values, the last $n$ of said elements of said pattern of $Ki$ additional elements being identical to said $n$ of said elements from said buffer, and wherein one of said K possible combinations of $n$ elements is formed by each element $i$ of said pattern of $Ki$ additional elements with $n-1$ of said elements which precede said element $i$, and where $i$ is an integer greater than zero and not greater than $Ki$.

8. The system of claim 7 further comprising:

receiving means at a node for receiving said elements comprising said message including at least one of said patterns of $Ki$ additional elements of said transmission rate of said one of said links;

storing means at said node for storing said elements comprising said message including said at least one pattern of $Ki$ additional elements in a buffer at said node;

transmitting means at said node for transmitting said elements, one at a time, from said buffer at said node, to a receiving device at a transmission rate which is lower than said transmission rate of said one of said links but at a rate which is not lower than a rate at which said elements comprising said message are being transmitted from said sending device;

pattern detecting means connected to said receiving means for detecting when a complete one of said patterns of $Ki$ additional elements is stored in said buffer; and detecting means connected to said storing means, to said pattern detecting means, and to said transmitting means for detecting when a predetermined number of said elements remain stored in said buffer at said node, said detecting means generating a delete pattern signal to said storing means so that at least one of said additional patterns of $Ki$ additional elements may be deleted from said buffer at said node to avoid overflow of said buffer at said node.

9. The system of claim 8 wherein said pattern generator further comprises:

a register connected to said buffer for storing a last $n$ successive elements of said message as said message is being transmitted from said buffer;

AND and OR logic circuits connected to said register, said AND and OR circuits being responsive to each of the possible combinations of said last $n$ stored elements; and a pattern memory for storing each of said patterns of $Ki$ elements, said pattern memory having addressing inputs connected to said AND and OR circuits for selecting one of said patterns of $Ki$ elements for transmission following said last $n$ elements from said buffer.

10. The system of claim 9 wherein said pattern detecting means further comprises:

a message register connected to said receiving means for storing $n$ elements;

AND/OR logic circuits connected to said message register for determining a next element which is to be expected next in said patterns of $Ki$ elements;

comparing means connected to said AND/OR logic circuits and to said receiving means for providing an output when said next element determined by said AND/OR logic circuits is the same as a next sequential element received from said receiving means; and counting means for counting the number of times said output is provided by said comparing means and indicating that one of said patterns of $Ki$ elements is stored in said buffer at said node when the count in said counting means reaches a count equal to $Ki$.

* * * * *